United States Patent
Iwato et al.

(10) Patent No.: US 8,520,181 B2
(45) Date of Patent: Aug. 27, 2013

(54) LIQUID CRYSTAL DISPLAY DEVICE

(75) Inventors: Hiroaki Iwato, Mobara (JP); Yoshiki Watanabe, Ootaki (JP); Norimichi Shirai, Chiba (JP); Kazumi Kanesaka, Chounan (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 133 days.

(21) Appl. No.: 13/099,648

(22) Filed: May 3, 2011

(65) Prior Publication Data

US 2011/0205474 A1    Aug. 25, 2011

Related U.S. Application Data

(63) Continuation of application No. 12/334,659, filed on Dec. 15, 2008, now Pat. No. 8,027,011.

(30) Foreign Application Priority Data

Dec. 18, 2007 (JP) ................................ 2007-326080

(51) Int. Cl.
    *G02F 1/1339* (2006.01)
    *G02F 1/1335* (2006.01)

(52) U.S. Cl.
    USPC ........... 349/157; 349/106; 349/108; 349/155; 349/156

(58) Field of Classification Search
    USPC ................... 349/155–157, 106–109
    See application file for complete search history.

(56) References Cited

U.S. PATENT DOCUMENTS

| | | | |
|---|---|---|---|
| 4,917,471 A | | 4/1990 | Takao |
| 5,680,187 A | | 10/1997 | Nagayama et al. |
| 5,815,232 A | * | 9/1998 | Miyazaki et al. ............. 349/155 |
| 5,969,784 A | * | 10/1999 | Miyazaki et al. ............. 349/155 |
| 6,147,729 A | | 11/2000 | Kurauchi et al. |
| 6,275,280 B1 | | 8/2001 | Kajita |
| 6,287,733 B1 | | 9/2001 | Miyazaki et al. |
| 6,459,468 B2 | | 10/2002 | Shibahara |
| 6,671,025 B1 | | 12/2003 | Ikeda |
| 6,762,818 B2 | | 7/2004 | Yamada |
| 6,842,207 B2 | | 1/2005 | Nishida |

(Continued)

FOREIGN PATENT DOCUMENTS

| | | |
|---|---|---|
| JP | 09-049914 | 2/1997 |
| JP | 10-082909 | 3/1998 |

(Continued)

*Primary Examiner* — Rhonda Peace
(74) *Attorney, Agent, or Firm* — Antonelli, Terry, Stout & Kraus, LLP.

(57) ABSTRACT

A liquid crystal display device includes a TFT substrate, a facing substrate and liquid crystal sandwiched therebetween. First pixels for displaying a first color according to a first color filter, second pixels for displaying a second color according a second color filter and third pixels for displaying a third color according to a third color filter are aligned in a longitudinal direction on the facing substrate, respectively. The first color filters, the second color filters, and the third color filters extend in stripes in the longitudinal direction so as to cover the first, second and third pixels, respectively. First spacers are formed between the first pixels by layering a number of color filters, including the first color filters, and second spacers are formed of a number of color filters, including the second color filters, between the second pixels. The first color filters which are formed between the second pixels are circular in plan view.

19 Claims, 15 Drawing Sheets

(56) References Cited

U.S. PATENT DOCUMENTS

| | | |
|---|---|---|
| 6,870,593 B2 | 3/2005 | Satoh |
| 7,433,004 B2 | 10/2008 | Tsubata |
| 7,570,323 B2 | 8/2009 | Yagi |
| 7,586,563 B2 | 9/2009 | Tokuda |
| 7,847,890 B2 | 12/2010 | Lee |
| 8,027,011 B2 * | 9/2011 | Iwato et al. .................. 349/156 |
| 2002/0140894 A1 | 10/2002 | Morimoto |
| 2003/0128311 A1 | 7/2003 | Tsuda et al. |
| 2004/0090582 A1* | 5/2004 | Ikeda et al. .................. 349/130 |
| 2004/0125322 A1 | 7/2004 | Sawasaki |
| 2004/0223096 A1 | 11/2004 | Ochiai |
| 2004/0252260 A1 | 12/2004 | Nishida et al. |
| 2004/0252271 A1* | 12/2004 | Song .............................. 349/155 |
| 2005/0280755 A1 | 12/2005 | Nishida |
| 2006/0028598 A1 | 2/2006 | Lee |
| 2006/0033876 A1 | 2/2006 | Park |
| 2006/0044502 A1 | 3/2006 | Takagi |
| 2006/0103785 A1 | 5/2006 | Yamada |
| 2009/0153785 A1* | 6/2009 | Iwato et al. ................... 349/106 |
| 2010/0097553 A1* | 4/2010 | Shoraku et al. ............... 349/122 |
| 2011/0205474 A1* | 8/2011 | Iwato et al. ................... 349/106 |

FOREIGN PATENT DOCUMENTS

| | | |
|---|---|---|
| JP | 10-232310 | 9/1998 |
| JP | 2003-084289 | 3/2003 |
| JP | 2003-233064 | 8/2003 |
| JP | 2005-122150 | 5/2005 |

* cited by examiner

X1-X2

R1-R2

X1-X2

R1-R2

B1-B2

G1-G2

LIQUID CRYSTAL DISPLAY DEVICE

CROSS REFERENCE TO RELATED APPLICATION

This application is a continuation of U.S. application Ser. No. 12/334,659, filed Dec. 15, 2008, now U.S. Pat. No. 8,027,011, the contents of which are incorporated herein by reference.

The present application claims priority over Japanese application JP2007-326080 filed on Dec. 18, 2007, the content of which is hereby incorporated into this application by reference.

BACKGROUND OF THE INVENTION (1) Field of the Invention

The present invention relates to a technology for defining the space between a TFT substrate and a facing substrate in a liquid crystal display using a support pillar system.

(2) Related Art Statement

In liquid crystal display devices, the space between the TFT substrate on which pixel electrodes and thin film transistors (TFT's) are formed and the facing substrate on which color filters and the like are formed is filled in with liquid crystal so that an image is formed by controlling the molecules of this liquid crystal by means of an electrical field. The space between the TFT substrate and the facing substrate is as small as several microns. It is extremely important to set an appropriate space between the TFT substrate and the facing substrate in order to control the transmission of light through the liquid crystal.

The space between the TFT substrate and the facing substrate in conventional liquid crystal display devices is created by dispersing beads or the like. When beads are dispersed, however, beads are also provided in regions where pixel electrodes are formed, and such a problem arises that light is scattered in these portions and the contrast lowers.

Meanwhile, conventional methods that have been developed for filling the space between the substrates with liquid crystal include: a method for sealing the space between the TFT substrate and the facing substrate, providing an opening in a portion of the sealing material, and injecting liquid crystal through the opening; and a method for dropping a necessary amount of liquid crystal onto the TFT substrate, and after that pasting the facing substrate so as to seal the liquid crystal. In any cases where beads are dispersed, the beads move, creating locations where there are many beads and locations where there are few beads when the liquid crystal is dropped. In addition, beads are dispersed into regions with pixels through which light from the backlight transmits, and this may cause a lowering of the open area ratio.

In order to solve the above described problem, a method for forming support pillars of an organic film on the facing substrate (support pillar system) has been developed as a method for defining the space between the TFT substrate and the facing substrate. Support pillars can be provided in portions where there are no pixel electrodes, that is to say, portions through which light from the backlight transmits. Accordingly, the brightness (the open area ratio) is not lowered. In addition, the support pillars are fixed to the facing substrate, and thus do not move when liquid crystal is dropped. Accordingly, the method for maintaining the space with support pillars is preferable for a system where liquid crystal is dropped (liquid crystal dropping and sealing system).

In general, these support pillars are formed on a black matrix on the facing substrate. The support pillars are formed of a resin, such as acryl, and one photolithographic step is required in order to form these support pillars according to the prior art. "Patent Document 1" describes a technology for forming multilayer support pillars of color filters in order to omit the photolithographic step of creating support pillars.

Meanwhile, in the case where multilayer support pillars are formed of color filters, color filters for each color must be precisely positioned in the support pillar portions; otherwise, the height of the support pillars becomes inconsistent. As a measure against this problem, "Patent Document 2" describes a technology for keeping the height of the support pillars constant by using color filters of which the form in plane is rectangular as the support pillars, and changing the orientation of the longitudinal axis of the rectangles by 90 degrees every time color filters are layered.

[Patent Document 1] Japanese Unexamined Patent Publication H9 (1997)-49914

[Patent Document 2] Japanese Unexamined Patent Publication 2003-233064

SUMMARY OF THE INVENTION

Problem to be Solved by the Invention

The space between the TFT substrate and the facing substrate has an optimal value depending on the drive system, the material for liquid crystal and the like, and this value differs for each product. When the space between the TFT substrate and the facing substrate is not appropriate, the contrast lowers. In the case where conventional spacers are formed of multilayer color filters, the height of the spacers is fixed to a multiple of the thickness of the color filters of a natural number, and thus it is difficult to set the space between the TFT substrate and the facing substrate to an optimal value.

In addition, in display devices, a black matrix, which is a light blocking film in frame form, is formed on the facing substrate in the periphery of the display region where an image is to be formed. A portion of the TFT substrate corresponding to the portion of the black matrix in the periphery does not have as many wires and the like as in the display region, and therefore the spacers in the periphery portion must be taller than the spacers in the display region. However, it is difficult to form spacers having different heights within the same liquid crystal display panel in accordance with the above described prior art where multilayer spacers are formed of color filters.

The present invention is provided in order to solve the above described problems and implement a technology for using color filters as spacers where the height of the spacers can be finely controlled if necessary.

Meanwhile, the price of the material for liquid crystal in liquid crystal display devices is high, and therefore it is necessary to reduce the amount of used liquid crystal in order to reduce the cost of the liquid crystal display device. In addition, the coefficient of thermal expansion of liquid crystal is higher than the solid materials, such as spacers, glass and wires. Liquid crystal display devices are used outdoors, and therefore the temperature range for use is wide. Accordingly, the inside of the liquid crystal display panel receives various types of stress through thermal expansion or contraction of the liquid crystal. In order to reduce this thermal stress of the liquid crystal, it is better for the amount of liquid crystal to be smaller.

Another object of the present invention is to reduce the amount of liquid crystal inside a liquid crystal display panel so that the cost of the liquid crystal display device is reduced, and the stress through thermal expansion of the liquid crystal within the liquid crystal display panel is reduced, and thus to increase the reliability of the liquid crystal display panel.

Means for Solving Problem

The present invention is characterized in that multilayer spacers are formed of a number of color filters, and the height of the spacers is finely controlled by changing the areas of the color filters for forming the spacers.

In addition, the present invention is characterized in that first spacers and second spacers having different heights are formed, and the difference in the height between the first spacers and the second spacers is created by changing the areas of the color filters for forming the first spacers and the second spacers, or by changing the order of the color filters in the multilayer spacers.

Furthermore, the present invention is characterized in that the amount of liquid crystal used is reduced by providing color filters between pixels which do not contribute to the formation of an image. Concrete means are as follows.

(1) A liquid crystal display device, having a TFT substrate, a facing substrate and liquid crystal sandwiched between the above described TFT substrate and the above described facing substrate, characterized in that first pixels for displaying a first color by means of first color filters, second pixels for displaying a second color by means of second color filters, and third pixels for displaying a third color by means of third color filters are formed in a matrix on the above described facing substrate, first spacers for defining the space between the above described facing substrate and the above described TFT substrate, and second spacers shorter than the above described first spacers are formed on the above described facing substrate, the above described first spacers are formed by layering a number of color filters in such a manner that the area of color filters on the lower side from among the above described number of color filters is greater than the area of color filters on the upper side, and the above described second spacers are formed by layering a number of color filters in such a manner that the area of color filters on the lower side from among the above described number of color filters is smaller than the area of color filters on the upper side.

(2) The liquid crystal display device according to (1), characterized in that the above described first spacers are formed of three layers of color filters in such a manner that the area of the color filters in the uppermost layer is the smallest, and the above described second spacers are formed of three layers of color filters in such a manner that the area of the color filters in the lowermost layer is the smallest.

(3) The liquid crystal display device according to (1), characterized in that the above described second spacers are formed of three layers of color filters in such a manner that the area of the color filters in the lowermost layer is the smallest, the area of the color filters in the uppermost layer is the greatest, and the area of the color filters in the middle layer is greater than the area of the color filters in the lowermost layer and smaller than the area of the color filters in the uppermost layer.

(4) The liquid crystal display device according to (1), characterized in that the above described first spacers are formed between the above described first pixels aligned in the longitudinal direction, and the above described second spacers are formed between the above described second pixels aligned in the longitudinal direction.

(5) A liquid crystal display device, having a TFT substrate, a facing substrate and liquid crystal sandwiched between the above described TFT substrate and the above described facing substrate, characterized in that first pixels for displaying a first color by means of a first color filter are aligned in the longitudinal direction, second pixels for displaying a second color by means of a second color filter are aligned in the longitudinal direction, and third pixels for displaying a third color by means of a third color filter are aligned in the longitudinal direction on the above described facing substrate, the above described first color filters extend in stripes in the longitudinal direction so as to cover the above described first pixels, the above described second color filters extend in stripes in the longitudinal direction so as to cover the above described second pixels, and the above described third color filters extend in stripes in the longitudinal direction so as to cover the above described third pixels, and first spacers are formed between the above described first pixels by layering a number of color filters, including the above described first color filters.

(6) The liquid crystal display device according to (5), characterized in that second spacers are formed of a number of color filters, including the above described second color filters, between the above described second pixels, and the above described first spacers is taller than the above described second spacers.

(7) The liquid crystal display device according to (5), characterized in that the above described first color filters extend in the lateral direction in stripes between the above described second pixels and between the above described third pixels.

(8) The liquid crystal display device according to (7), characterized in that the above described first spacers are formed of three layers of color filters, including the above described first color filters, and the above described second spacers are formed of three layers of color filters, including the above described second color filters.

(9) The liquid crystal display device according to (8), characterized in that a number of color filters are layered between the above described third pixels.

(10) A liquid crystal display device, having a TFT substrate, a facing substrate and liquid crystal sandwiched between the above described TFT substrate and the above described facing substrate, characterized in that a display region for displaying an image and a light blocking region in frame form surrounding the above described display region are formed on the above described facing substrate, first pixels for displaying a first color by means of first color filters, second pixels for displaying a second color by means of second color filters, and third pixels for displaying a third color by means of third color filters are formed in a matrix in the above described display region on the above described facing substrate, and spacers for defining the space between the above described facing substrate and the above described TFT substrate are formed of the above described first color filters, the above described second color filters and the above described third color filters in the above described light blocking region in frame form on the above described facing substrate, and the height of the above described spacers is greater towards the outside of the above described light blocking region.

(11) The liquid crystal display device according to (10), characterized in that any of the above described first color filters, the above described second color filters and the above described third color filters which form the above described spacers has an area which is greater towards the outside of the above described light blocking region.

(12) The liquid crystal display device according to (11), characterized in that the above described spacers are formed of a number of filters from among the above described first color filters, the above described second color filters and the above described third color filters.

Effects of the Invention

According to the present invention, spacers are formed by layering a number of color filters, and therefore a separate photolithographic process for forming spacers is not necessary, and in addition, the height of the spacers can be finely controlled by changing the area of the color filters which form the spacers.

In addition, according to the present invention, when first spacers and second spacers having different heights are formed, the area of the color filters for forming the first spacers and the second spacers varies, or the order of layering of the color filters varies so that the difference in the height between the first spacers and the second spacers is created, and thus the heights of the first spacers and the second spacers can be finely controlled.

Furthermore, according to the present invention, color filters are provided between pixels which do not contribute to the formation of an image, and therefore the amount of liquid crystal used can be reduced, and the cost of the materials for the liquid crystal display device can be reduced.

EXPLANATION OF SYMBOLS

Figure 1A:
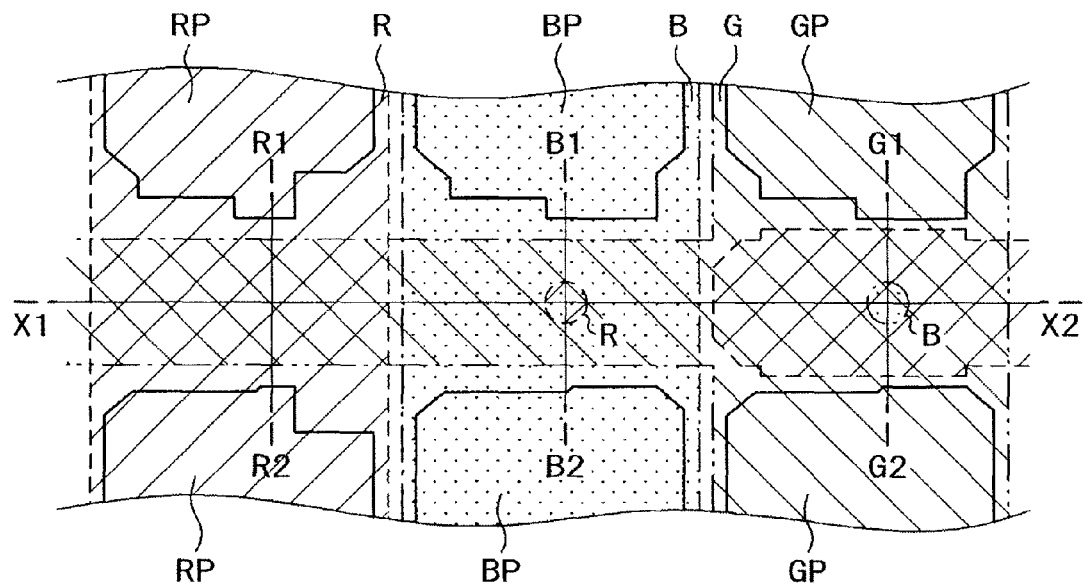
FIGS. 1A to 1E are diagrams showing a main portion of the facing substrate according to the first embodiment.

10 . . . first spacer
15 . . . spacer support
20 . . . second spacer
30 . . . spacer in periphery
100 . . . TFT substrate
101 . . . scanning line
102 . . . SD electrode
103 . . . gate insulating film
104 . . . α-Si
105 . . . passivation film
106 . . . orientation film
107 . . . liquid crystal layer
130 . . . terminal portion
150 . . . sealing portion
200 . . . facing substrate
201 . . . counter electrode
205 . . . rib
210 . . . display region
220 . . . peripheral light blocking region
1021 . . . video signal line
1022 . . . support metal
R . . . red color filter
G . . . green color filter
B . . . blue color filter
RP . . . red pixel
GP . . . green pixel
BP . . . blue pixel
BM . . . black matrix
OC . . . overcoat film

DETAILED DESCRIPTION OF THE INVENTION

Figure 6:
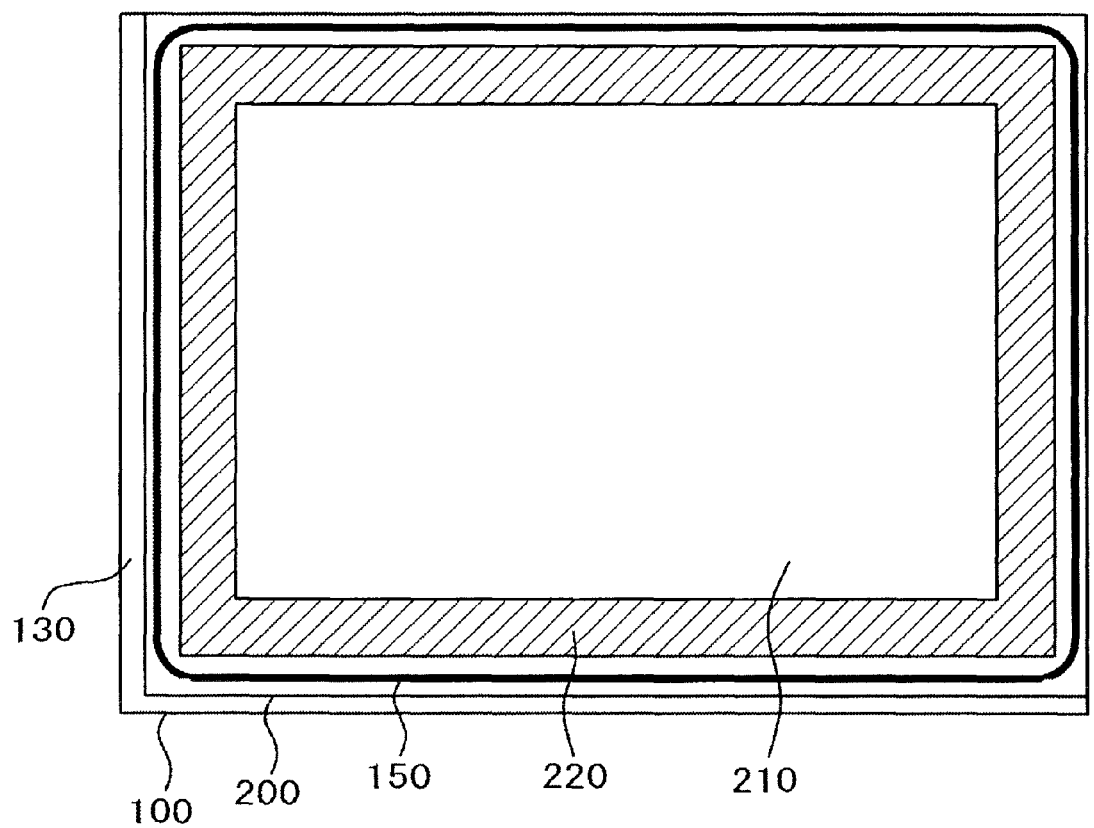
FIG. 6 is a plan diagram showing a liquid crystal display panel.

The present invention is described in detail in reference to the drawings. FIG. 6 is a plan diagram showing a liquid crystal display panel used in a liquid crystal display device to which the present invention is applied. In FIG. 6, a TFT substrate 100 and a facing substrate 200 are layered on top of each other. The TFT substrate 100 and the facing substrate 200 are pasted together by means of a sealing portion 150 formed in the periphery, and liquid crystal is sealed inside the sealing portion 150. The space between the TFT substrate 100 and the facing substrate 200 is kept constant by means of spacers. Here, the spacers in the present specification are support pillars formed on the facing substrates, and hereinafter these support pillars are simply referred to as spacers.

The TFT substrate 100 is formed so as to be greater than the facing substrate 200, and a terminal portion 130 for supplying video signals, the power supply and the like to the liquid crystal display panel from the outside is formed in the periphery of the TFT substrate 100 on the lower left side in FIG. 6. A display region 210 is formed as a major portion on the facing substrate 200. A peripheral light blocking film 220 is formed as a black matrix BM in frame form in the periphery of the display region 210.

Figure 7:
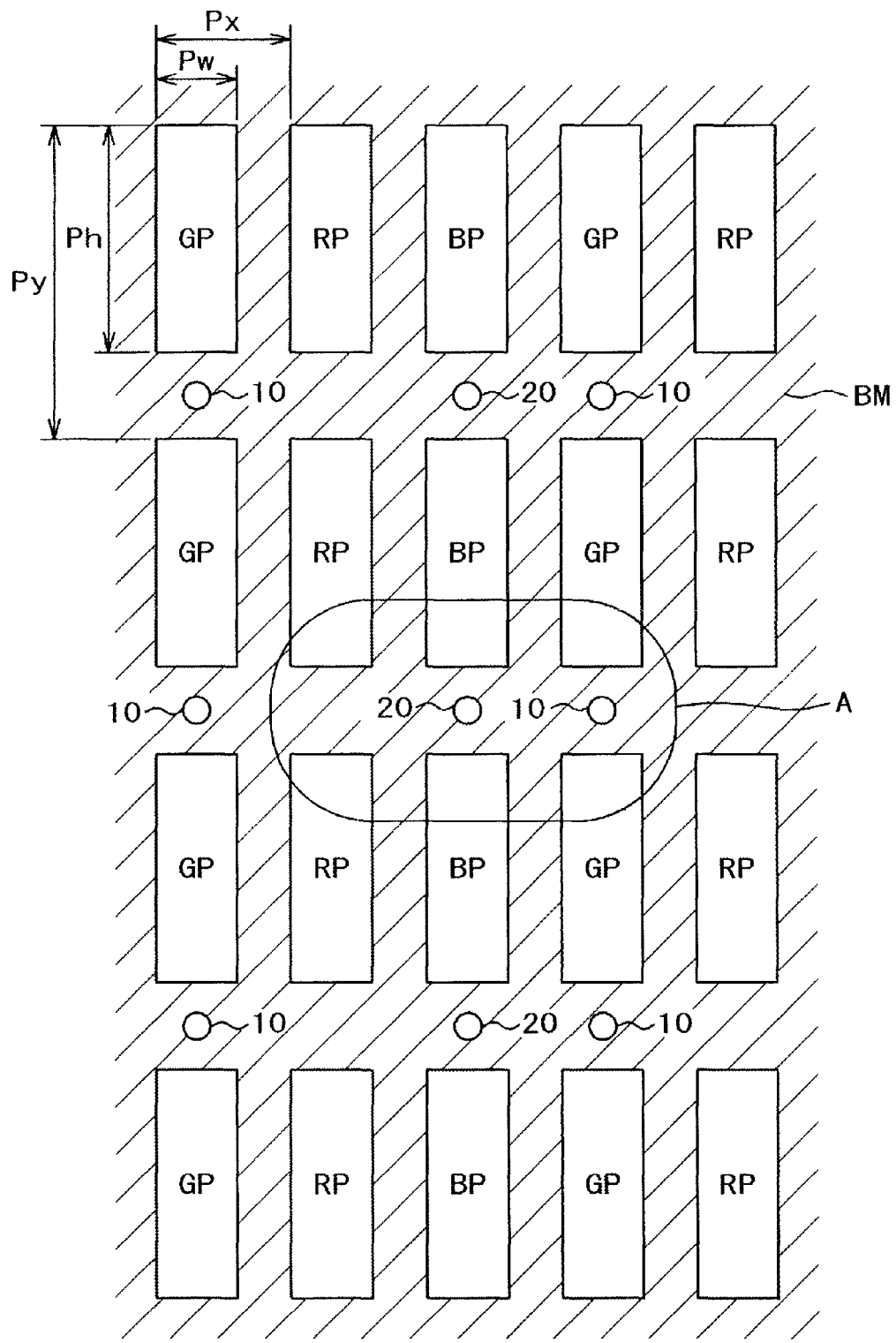
FIG. 7 is a diagram showing the pixel arrangement in the facing substrate.

FIG. 7 shows an example of the arrangement of pixels in the display region 210 on the facing substrate 200. In FIG. 7, red pixels RP, blue pixels BP and green pixels GP are aligned at a constant pitch Px in the lateral direction. Here, to be precise, though the red pixels RP, the blue pixels BP and the green pixels GP are holes of the BM corresponding to the red pixels RP, the blue pixels BP and the green pixels GP, they are simply referred to as red pixels RP, blue pixels BP and green pixels GP in order to avoid complexity. Pixels of the same color are aligned at a constant pitch Py in the longitudinal direction. The width of each pixel is Pw and the longitudinal diameter of each pixel is Ph. The pitch Px in the lateral direction is 170.25 μm, for example, and the pitch Py in the longitudinal direction is 510.75 μm, for example. Meanwhile, the width Pw of the pixels is 143.25 μm and the longitudinal diameter Ph of the pixels is 410.75 μm.

As shown in FIG. 7, spacers are formed on the black matrix BM between the pixels in the longitudinal direction, and therefore the regions which can be used for the formation of spacers have a length of 100 μm in the longitudinal direction. There are no particular limitations in the width of the spacers when used in the lateral direction. Though in FIG. 7 the form of the spacers in a plane is circular, in the case where it is desired to increase the area of the spacers, the form of the spacers in a plane can be elliptical or rectangular. In FIG. 7, only the form of the spacers in a plane is shown. To be precise, though the form of the spacers in a cross section in the longitudinal direction is trapezoidal, there is no great difference in the area between the upper portion and the lower portion of the trapezoid. The plan diagram showing the spacers in FIG. 7 can be considered to show the form of the upper portions of the spacers.

In FIG. 7, though first spacers 10 are formed between the green pixels GP and second spacers 20 are formed between the blue pixels BP, no spacers are formed between the red pixels RP. In addition, the first spacers 10 are taller than the second spacers 20. The space between the TFT substrate 100 and the facing substrate 200 is usually defined by the first spacers 10. In the case where pressure is applied to the liquid crystal display panel from the outside, the space between the TFT substrate 100 and the facing substrate 200 defined by the first spacers 10 becomes smaller, and at this time the second spacers 20 make contact with the TFT substrate 100 so as to prevent excessive deformation of the TFT substrate 100 or the facing substrate 200.

Figure 8:
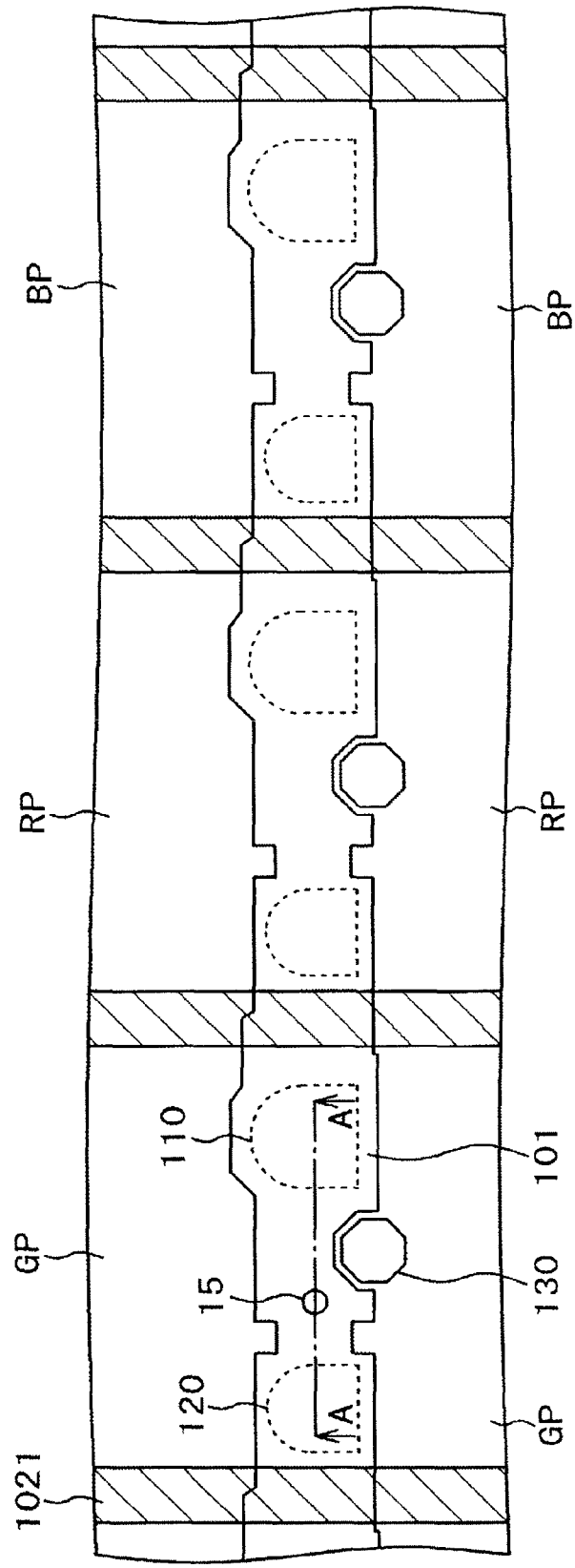
FIG. 8 is a schematic plan diagram showing a TFT substrate corresponding to FIGS. 1A to 1E.

FIG. 8 is a schematic diagram showing portions in the TFT substrate 100 with which spacers formed on the facing substrate 200 make contact. In FIG. 8, a scanning line 101 extends in the lateral direction. The portion on which the scanning line 101 lies corresponds to the black matrix BM which extends in the lateral direction between pixels in the longitudinal direction in FIG. 7. In FIG. 8, video signal lines 1021 extend in the longitudinal direction and are aligned in the lateral direction. The portions on which the video signal lines 1021 are formed correspond to the black matrix BM which extends in the longitudinal direction between pixels in the lateral direction in FIG. 7. Pixel electrodes are formed in sections partitioned by the scanning line 101 and the video signal lines 1021. The locations of the pixels electrodes correspond to red pixels RP, blue pixels BP and green pixels GP in FIG. 7.

In FIG. 8, first TFT's 110 and second TFT's 120 are formed along the scanning line 101. The TFT's are formed along the scanning line 101 because the scanning line 101 is used as the gate electrodes of the TFT's. The video signal lines 1021 are used as the source/drain electrodes of the TFT's. In FIG. 8, there are two TFT's in each section. Though the first TFT 110 is usually used, in the case where the first TFT 110 becomes defective during the manufacturing process, wires are modified so that the second TFT 120 can be used. Here, in some cases, the second TFT 120 is not formed. Through holes 130, as shown in FIG. 8, are created for the connection between the pixel electrodes and the TFT's. FIG. 8 is a plan diagram showing the locations of TFT's and the like, and the detail of the wires and the like are omitted.

In FIG. 8, spacer supports 15 are formed in locations between the first TFT's 110 and the second TFT's 120 which correspond to the first spacers 10 formed on the facing substrate 200. When the TFT substrate 100 and the facing substrate 200 are layered on top of each other, the spacer supports 15 formed on the TFT substrate 100 make contact with the first spacers 10 formed on the facing substrate 200 so as to define an appropriate space between the TFT substrate 100 and the facing substrate 200.

Figure 9:
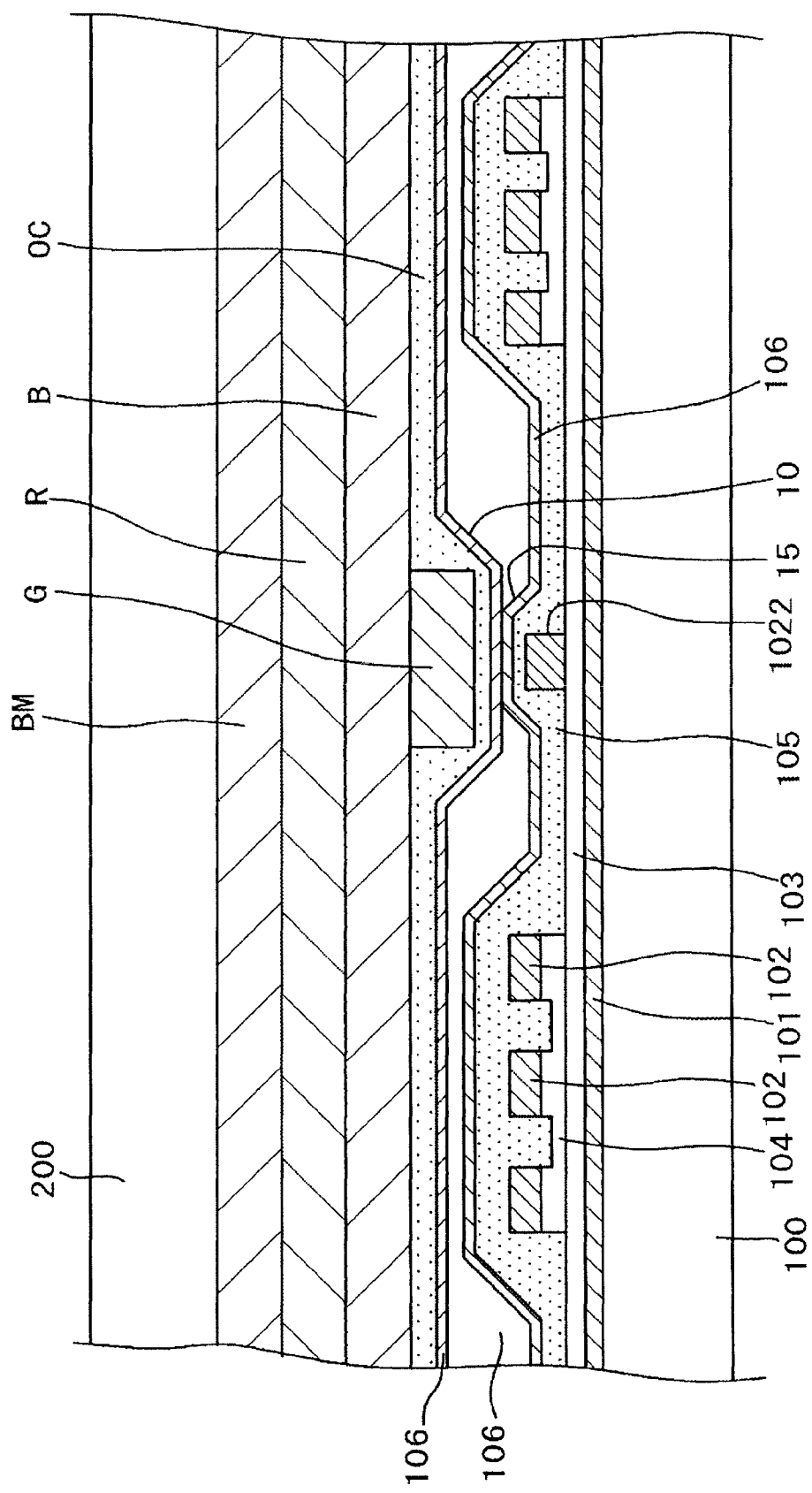
FIG. 9 is a cross sectional diagram showing the liquid crystal display panel along line A-A in FIG. 8.

FIG. 9 is a cross sectional diagram showing a portion in the vicinity of a spacer when the TFT substrate 100 and the facing substrate 200 are layered on top of each other. This cross section shows a portion corresponding to the cross section along line A-A in FIG. 8, for example. In FIG. 9, the black matrix BM is formed on the facing substrate 200, and a red color filter R along with a green color filter G are layered on top of this. A spacer in columnar form of a blue filter is formed on top of the green color filter G. An overcoat film OC, which is a passivation layer, is formed so as to cover the green filter G and the blue color filter B. An orientation film 106 for orienting liquid crystal is formed on top of the overcoat film OC.

A scanning line 101 is formed on top of the TFT substrate 100, and this scanning line 101 works as a gate electrode in a TFT portion. A gate insulating film 103 is formed on top of the scanning line 101. An α-Si film 104 is formed in portions where TFT's are formed. Source/drain electrodes (SD electrodes 102) with channel portions in between are formed on top of the α-Si film 104. Three SD electrodes 102 are formed on top of one portion of the α-Si film 104. In this case, the SD electrodes 102 on the two sides are sources and the SD electrode 102 in the middle is a drain, or vice versa. Channel etching for stabilizing the properties of the TFT's is carried out on the channel portions of the α-Si film 104.

A spacer support 15 is formed in a portion between two TFT's corresponding to a spacer formed on the facing substrate 200 using the same material and the same process as for the SD electrodes 102. A first spacer 10 is formed on the facing substrate 200 so as to correspond to this spacer support 15. A passivation film 105 is formed of SiN so as to cover the TFT's and the spacer support 15. The passivation film 105 is a film for protecting the TFT's. An orientation film 106 is formed so as to cover the passivation film 105.

In FIG. 9, the first spacer 10 formed on the facing substrate 200 and the spacer support 15 formed on the TFT substrate 100 make contact with each other. The spacer support 15 is formed of a support metal 1022 in the same process as for the SD electrodes 102. The first spacer 10 and the spacer support 15 define the space between the TFT substrate 100 and the facing substrate 200.

The formation of the spacer support 15 on the TFT substrate 100 side corresponding to the first spacer 10 is one example, and in some cases only the first spacer 10 defines the space between the TFT substrate 100 and the facing substrate 200. Here, as shown in FIG. 8, no spacer supports 15 are formed on the TFT substrate 100 in portions corresponding to the second spacers 20 shown in FIG. 7.

In FIG. 9, the space between the TFT substrate 100 and the facing substrate 200 is filled in with liquid crystal. As shown in FIG. 9, color filters are layered on the facing substrate 200 in a portion where a scanning line 101 is formed in other locations in addition to the first spacer 10, and therefore the space between the TFT substrate 100 and the facing substrate 200 is small. Accordingly, the amount of liquid crystal with which this region is filled in is very small.

It is necessary for the liquid crystal layer 107 to have a uniform thickness in order to have an appropriate display using the liquid crystal. As described above, the portions where pixel electrodes are formed require that the liquid crystal layer 107 have a uniform thickness. Meanwhile, the liquid crystal layer 107 does not contribute to a display in the regions where a scanning line is formed on the TFT substrate 100. Accordingly, in these portions, the amount of used liquid crystal can be smaller when the liquid crystal layer 107 is thinner. The material for the liquid crystal is expensive, and therefore the cost for the materials can be reduced by reducing the amount of liquid crystal used in these portions, and thus the cost for the manufacture of the liquid crystal display device can be reduced. In addition, stress due to the thermal expansion of liquid crystal can be lowered when the amount of liquid crystal is small.

In the example shown in FIG. 9, no counter electrodes are formed on the facing substrate 200. The embodiment of FIG. 9 is a case where the pixel electrodes and the counter electrodes for driving liquid crystal molecules 1071 are formed on the TFT substrate 100. This configuration is used for a so-called IPS (in plane switching) system driving method where the display is controlled by rotating liquid crystal molecules 1071 in the direction parallel to the TFT substrate 100. However, the present invention described below can be applied to a general TN (twisted nematic) system where counter electrodes are formed on the counter substrate 200 and a VA (vertical alignment) system in addition to the IPS system.

First Embodiment

FIG. 1 is a diagram showing the first embodiment of the present invention. FIG. 1A is a diagram showing the details of the region A in FIG. 7. FIG. 1B is a cross sectional diagram along X1-X2 in FIG. 1A, FIG. 1C is a cross sectional diagram along R1-R2 in FIG. 1A, FIG. 1D is a cross sectional diagram along B1-B2 in FIG. 1A, and FIG. 1E is a cross sectional diagram along G1-G2 in FIG. 1A. The form of the pixel electrodes shown in FIGS. 1A to 1E reflects the actual pixel electrodes. In FIGS. 1A to 1E, pixels of the same color are aligned in the longitudinal direction, and pixels of different colors are aligned in the lateral direction.

Figure 1B:
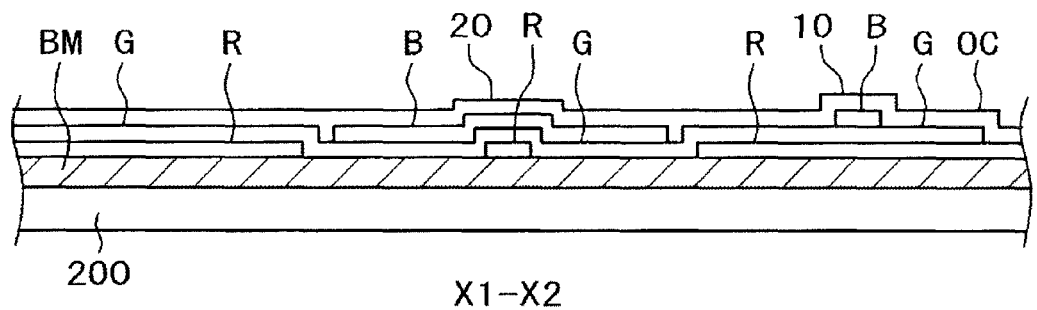
Figure 1C:
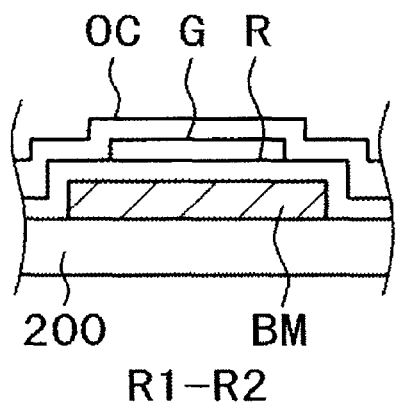
Figure 1D:
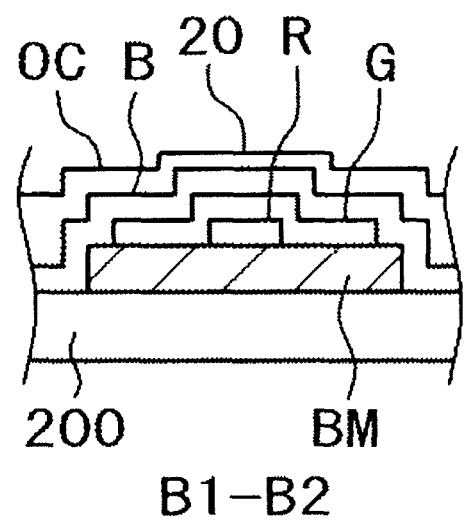
Figure 1E:
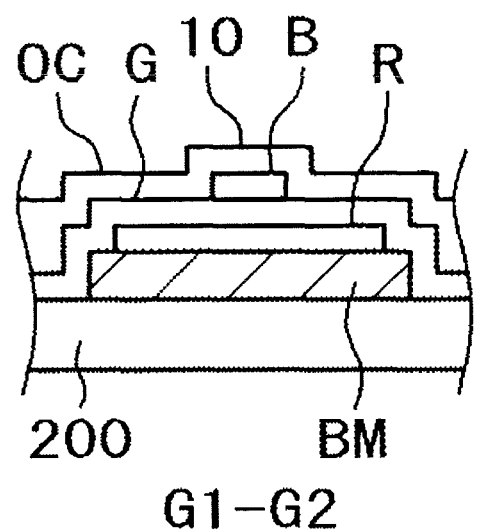

As shown in FIGS. 1B, 1D and 1E, first spacers 10 are formed between the green pixels GP and second spacers 20 are formed between the blue pixels BP. These spacers are formed of color filters. As shown in FIG. 1B, the first spacers 10 are taller than the second spacers 20.

As shown in FIG. 1B, in a first spacer 10, a red color filter R is layered on top of the black matrix BM, and a green color filter G is layered on top of this. A blue color filter B in columnar form is layered on top of the green color filter G, and thus the spacer is formed. In addition, an overcoat film OC is formed on top of this.

Meanwhile, as shown in FIG. 1B, in a second spacer 20, a red color filter R in columnar form is first formed on top of the black matrix BM, and a blue color filter B along with a green color filter G are layered on top of this. In addition, an overcoat film OC is formed on top of this.

The first spacers 10 are taller than the second spacers 20 for the following reasons. The first spacers 10 and the second spacers 20 are both multilayer spacers formed of three layers of color filters. The first spacers 10 and the second spacers 20 are different in that the spacer portion in columnar form is formed last in the first spacers 10, while the spacer portion in columnar form is formed first in the second spacers 20. Color filters are formed by dispersing a pigment in a photosensitive organic resin and liquid before being processed through photolithography. In the second spacers 20, a red color filter in columnar form is formed in a lower layer, and when green and blue color filters are layered on top of this, the color filters which are on top of the portion in columnar form become thinner as a result of leveling effects. Meanwhile, in the first spacers 10, the portion in columnar form is formed last, and therefore there are no leveling effects in upper layer films, unlike in the second spacers 20. Thus, the first spacers 10 become taller than the second spacers 20.

FIG. 1C is a cross sectional diagram along R1-R2 in FIG. 1A. As shown in FIG. 1C, in this portion, only two layers, which are the red color filter R and the green color filter G, are layered on top of the black matrix BM. Accordingly, this portion is lower than those shown in the cross section along B1-B2 and the cross section along G1-G2 in FIGS. 1D and 1E.

FIG. 1D is a cross section along B1-B2 in FIG. 1A. This shows the form of a second spacer 20 in a cross section. In this portion, three layers of color filters are formed on top of the black matrix BM in the order of the red color filter R, the green color filter G and the blue color filter B, and the red color filter R is formed in columnar form. Accordingly, the film thickness of the green color filter G and the blue color filter B on top of the red color filter R is reduced as a result of leveling effects as described above.

FIG. 1E is a cross sectional diagram along G1-G2 in FIG. 1A showing the form of a first spacer 10 in a cross section. In FIG. 1E, three layers, which are red color filter R, green color filter G and blue color filter B, are formed on top of the black matrix BM. In FIG. 1E, the blue color filter B layered lastly is formed in columnar form, and therefore there are no leveling effects in the red color filter R and the green color filter G. Accordingly, the first spacer 10 shown in FIG. 1A is taller than the second spacer 20 shown in FIG. 1D.

Figure 2:
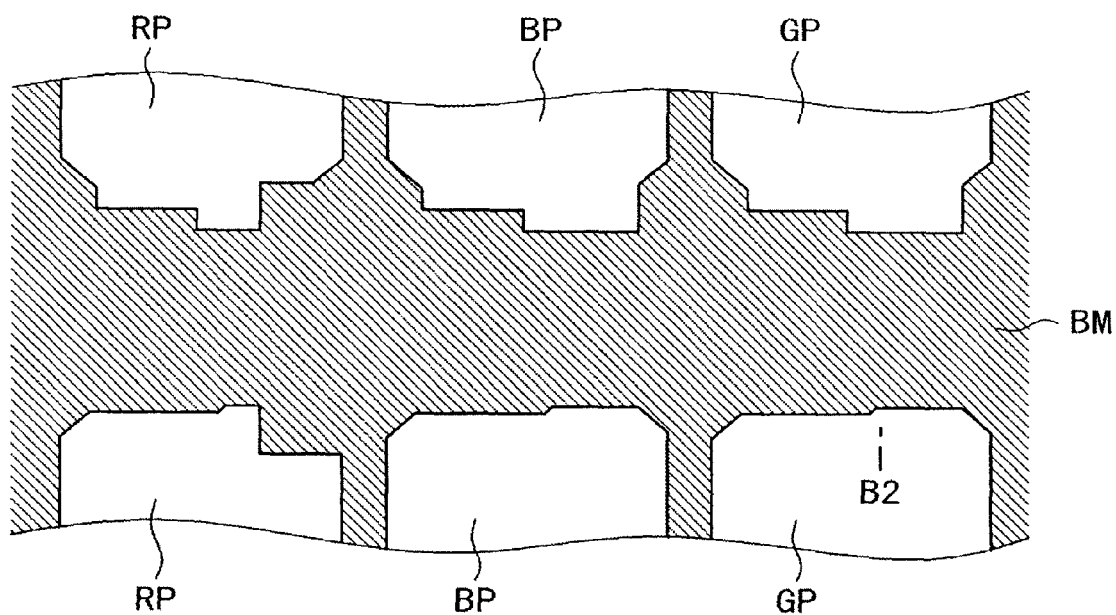
FIG. 2 is a plan diagram showing the black matrix according to the first embodiment.

FIGS. 2 to 5 are diagrams showing a process for forming the facing substrate 200 shown in FIGS. 1A to 1E. As shown in FIG. 2, first, a black matrix BM is formed so that pixels are defined. The black matrix BM is formed by applying a light shielding film throughout the entirety of the facing substrate 200, and after that removing the light blocking film from portions corresponding to the pixel electrodes through etching. Scanning lines 101 are formed in portions on the TFT substrate 100 corresponding to the portions in band form of the black matrix BM which extend in the lateral direction.

Figure 3:
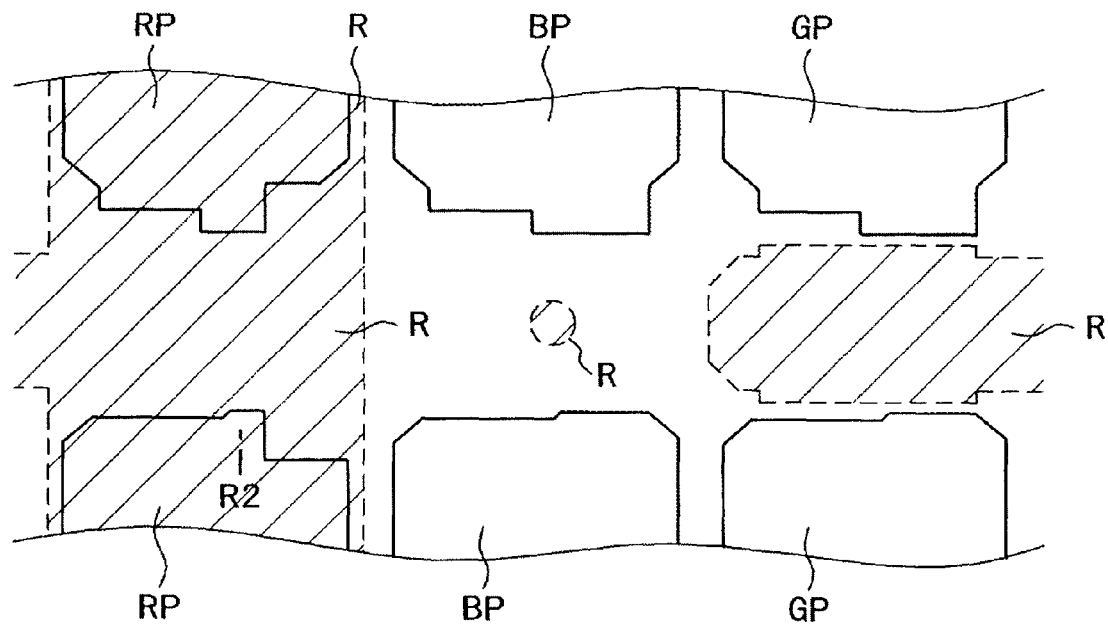
FIG. 3 is a plan diagram showing red color filters according to the first embodiment.

FIG. 3 shows a state where a red color filter R is formed on top of the R pixels and the black matrix BM. Though the red color filters on top of the red pixels RP plays its original role as a color filter, the red color filters R are also used as spacers and to save the material for liquid crystal in the present embodiment, and therefore red color filters R in addition to those on the red pixels RP are formed in other portions. That is to say, red color filters R in stripes are formed in the longitudinal direction, and thus the amount of liquid crystal with which the spaces between the red pixels RP are filled in can be saved.

In addition, the red color filters R in circular form between the blue pixels BP and the red color filters R in band form which is long in the lateral direction between the green pixels GP respectively form portions of the second spacers 20 and the first spacers 10. In FIG. 3, the red color filter R between the blue pixels BP is in circular form in a plane and has an area smaller than that of the red color filter R between the green pixels GP, and thus the second spacer 20 formed between the blue pixels BP is made shorter than the first spacer 10 formed between the green pixels GP.

Figure 4:
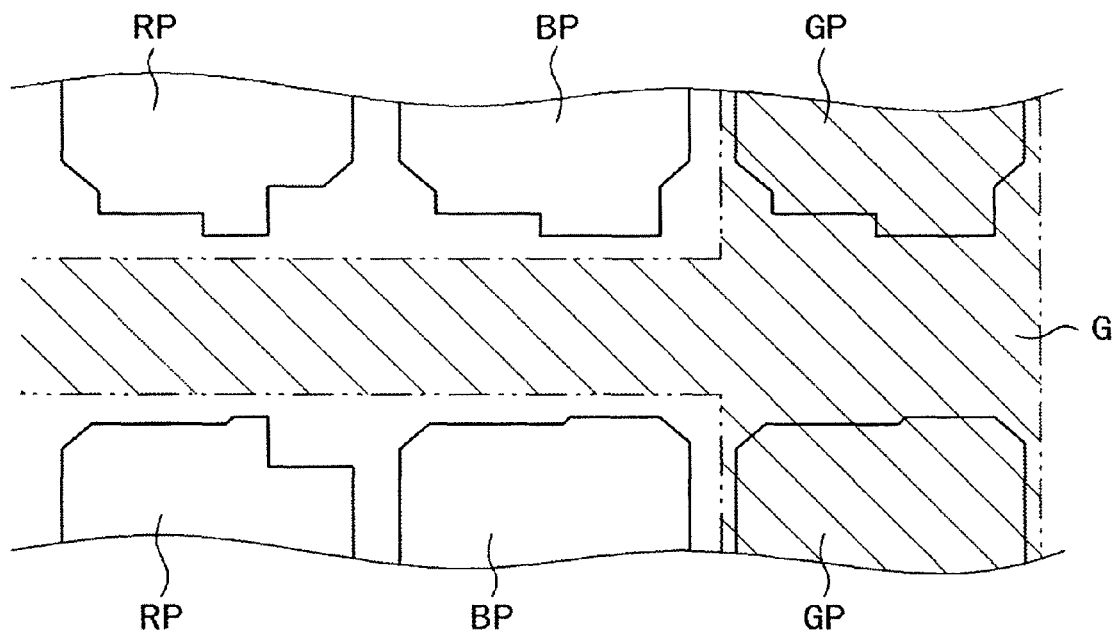
FIG. 4 is a plan diagram showing blue color filters according to the first embodiment.

Next, as shown in FIG. 4, a green color filter G is formed. Though the red color filters R are omitted in FIG. 4 in order to avoid complexity, the green color filter G is formed on top of the red color filters R formed in FIG. 3. In FIG. 4, the green color filter G is formed in a stripe in the longitudinal direction crossing the green pixels GP. Furthermore, the green color filter G is formed so as to extend in the lateral direction and cover the black matrix BM formed between the blue pixels BP and between the red pixels RP. The portion between the blue pixels BP becomes part of the second spacer 20, and the portion between the red pixels RP becomes a filler material to save the material for liquid crystal.

Figure 5:
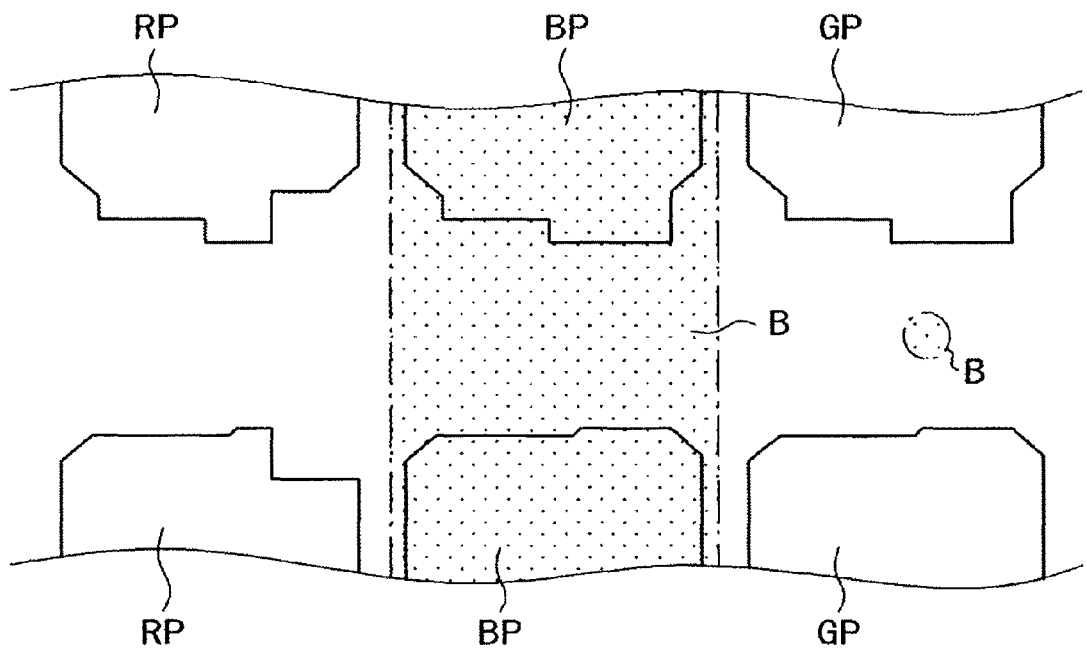
FIG. 5 is a plan diagram showing green color filters according to the first embodiment.

Finally, as shown in FIG. 5, blue color filters B are formed. Though the red color filters R and the green color filter G are omitted in FIG. 5 in order to avoid complexity, the blue color filters B are formed on top of the green color filter G. In FIG. 5, a blue color filter B is formed in a stripe in the longitudinal direction so that the blue color filter B covers the BM between the blue pixels BP. As a result, the material for liquid crystal with which the space between the blue pixels BP is filled in can be saved. In addition, a blue color filter B in circular form is formed between the green pixels GP, and thus the blue color filter B becomes part of the first spacer 10. The blue filter B in circular form is formed in the uppermost layer, and thus the first spacer 10 becomes higher than the second spacer 20 as described above.

In the above example, the difference in the height between the first spacer 10 and the second spacer 20 is created using the leveling effects of the color filters formed in layers above the color filter in columnar form. As a method for creating a difference in the height between the spacers, the leveling effects of color filters in upper layers can be used, and in addition, the areas of the spacers formed of color filters can be changed.

That is to say, color filters are formed so as to have a predetermined form by applying a liquid and exposing this to light so that the liquid reacts. In this case, the height of the color filter after processing becomes higher when the area of the color filter is great. Accordingly, it is possible to change the height of the first spacer 10 or the second spacer 20 by changing the area of the color filter in circular form shown in FIG. 3 or 5. As described above, the present invention can provide great freedom in changing the height of the spacers.

Second Embodiment

Figure 10A:
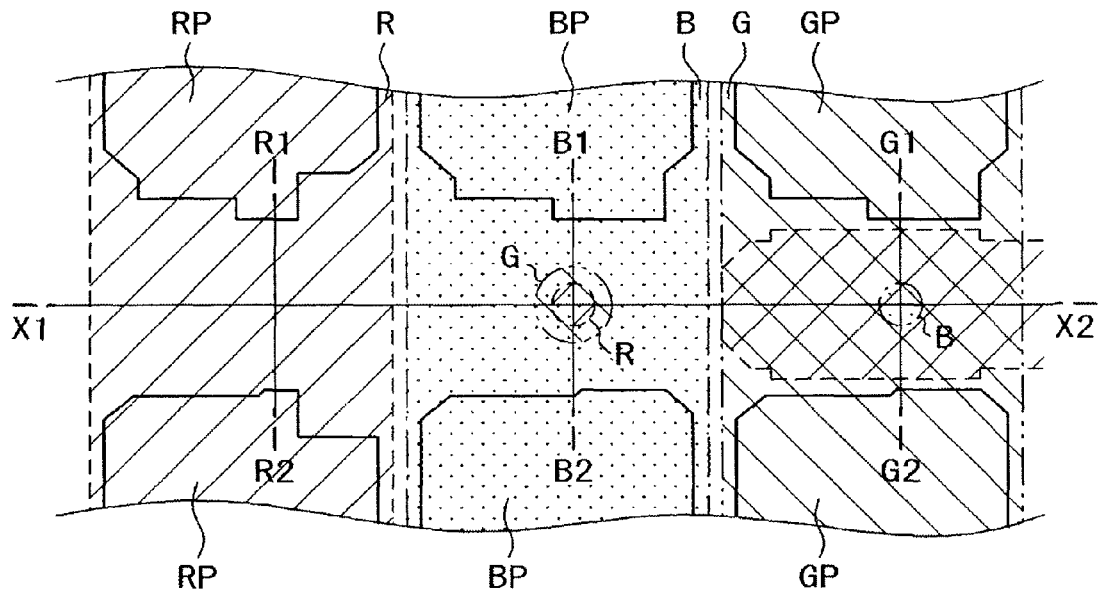
FIGS. 10A to 10E are diagrams showing a main portion of the facing substrate according to the second embodiment.
Figure 10B:
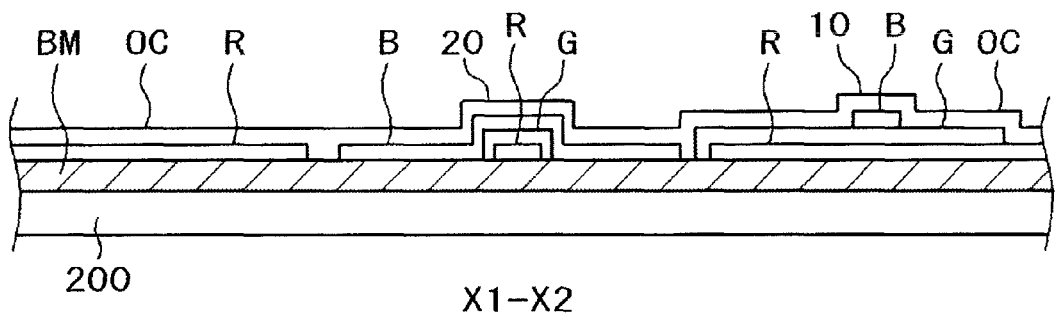
Figure 10C:
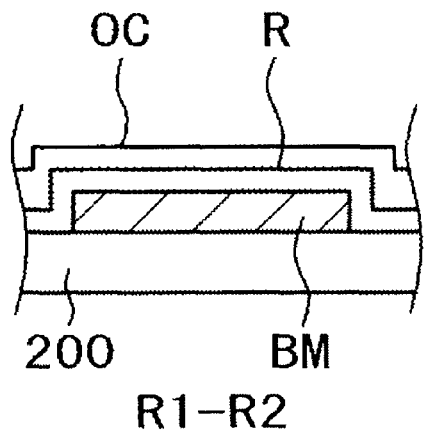
Figure 10D:
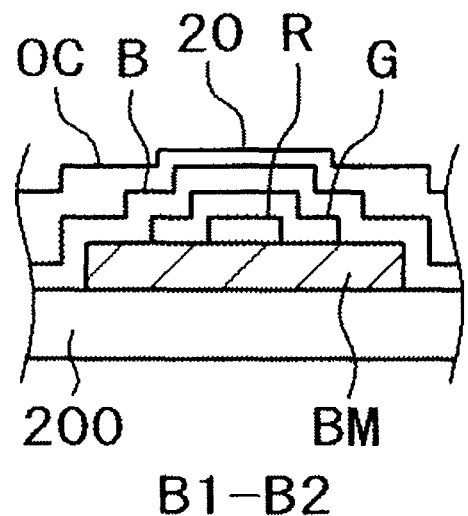
Figure 10E:
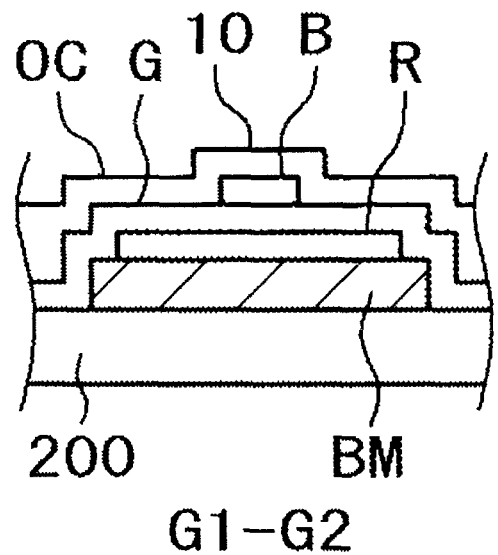

FIGS. 10A to 10E are diagrams showing the second embodiment of the present invention. FIG. 10A is a diagram showing the region A in FIG. 7 in detail. FIG. 10B is a cross sectional diagram along X1-X2 in FIG. 10A, FIG. 10C is a cross sectional diagram along R1-R2 in FIG. 10A, FIG. 10D is a cross sectional diagram along B1-B2 in FIG. 10A, and FIG. 10E is a cross sectional diagram along G1-G2 in FIG. 10A. The form of the pixel electrodes in FIGS. 10A to 10E reflects the actual pixel electrodes. In FIGS. 10A to 10E, pixels of the same color are aligned in the longitudinal direction, and pixels of different colors are aligned in the lateral direction.

As shown in FIGS. 10B, 10D and 10E, a first spacer 10 is formed between green pixels GP and a second spacer 20 is formed between blue pixels BP. These spacers are formed of color filters. As shown in FIG. 1B, the first spacer 10 is taller than the second spacer 20.

The present embodiment is different from the first embodiment in that the difference in height between the second spacer 20 and the first spacer 10 is greater than in the first embodiment. This is achieved by forming the second spacer 20 in accordance with a different method from in the first embodiment, so that the height of the second spacer 20 becomes smaller. In FIGS. 10A to 10E, the form and structure of the first spacer 10 between the green pixels GP are the same as in the first embodiment. In contrast, in the present embodiment, the second spacer 20 between the blue pixels BP is formed by layering a green color filter G in circular form in a plane on top of a red color filter R in circular form in a plane and layering a blue color filter B on top of this, as shown in FIG. 10A.

As shown in FIGS. 10B and 10D, a green color filter G in columnar form is formed on top of a red color filter R in columnar form in the second spacer 20. In the present embodiment, the area of the green color filter G in columnar form between the blue pixels BP is smaller than the area of the green color filter G in the first embodiment, and therefore, the green color filter G is thinner than in the case of the first embodiment.

Figure 11:
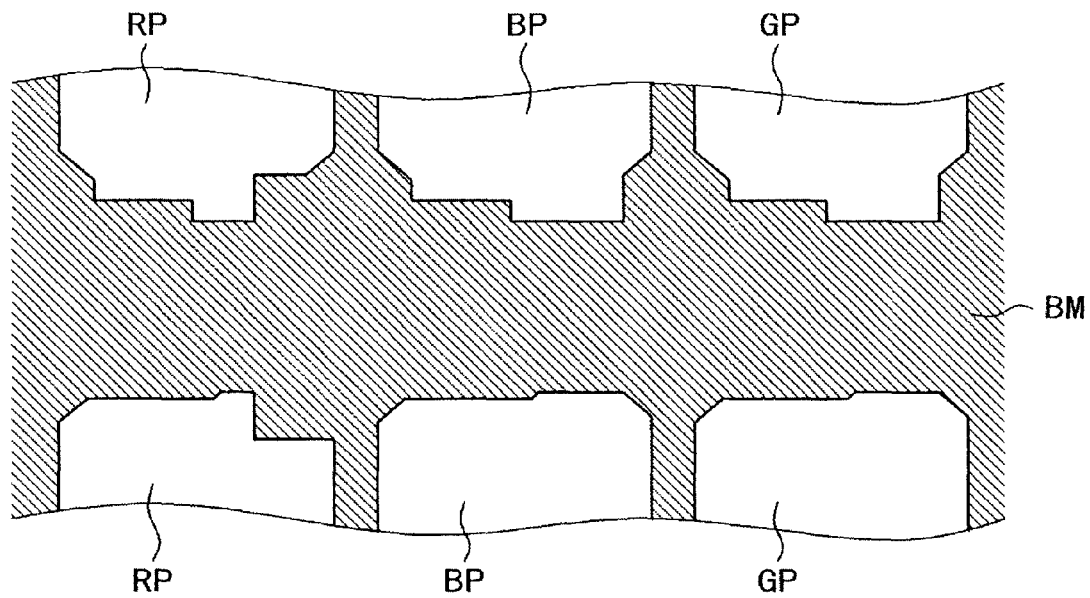
FIG. 11 is a plan diagram showing the black matrix according to the second embodiment.
Figure 12:
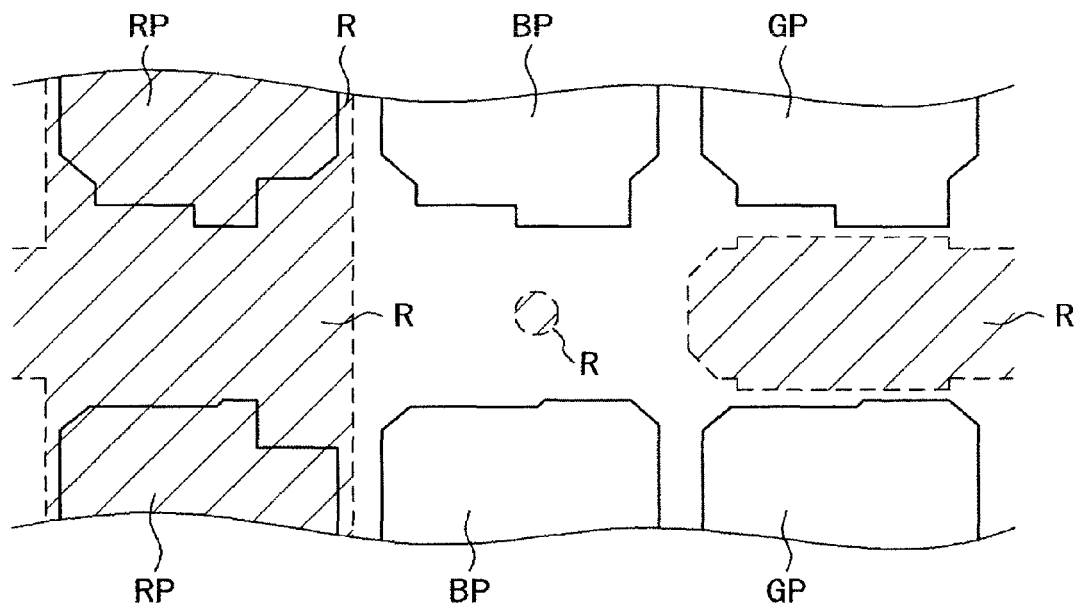
FIG. 12 is a plan diagram showing red color filters according to the second embodiment.
Figure 13:
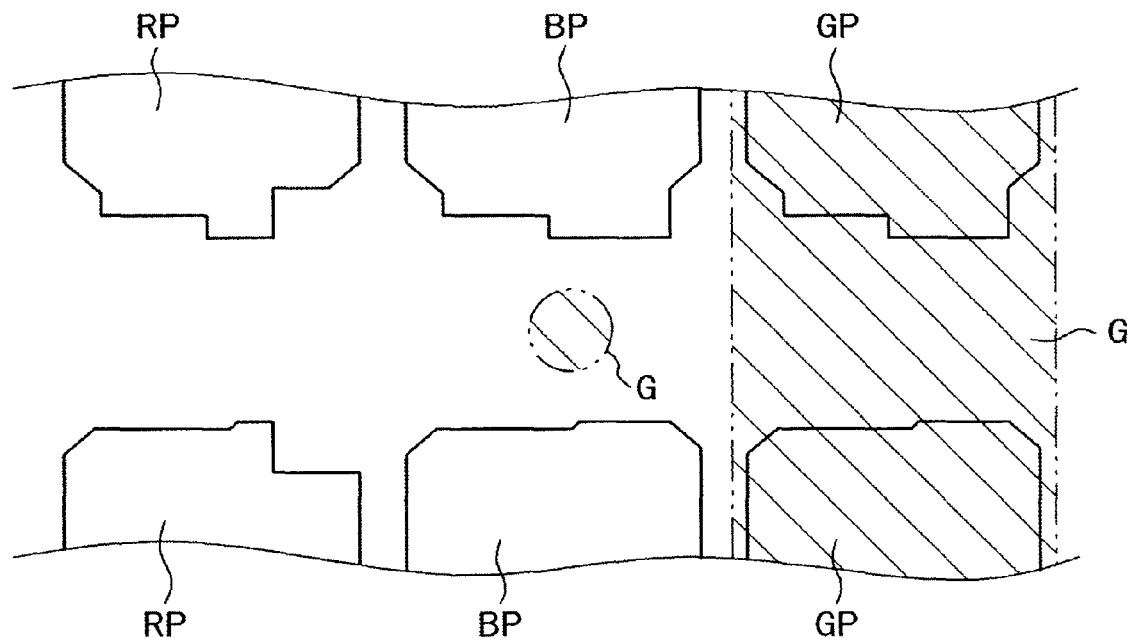
FIG. 13 is a plan diagram showing blue color filters according to the second embodiment.
Figure 14:
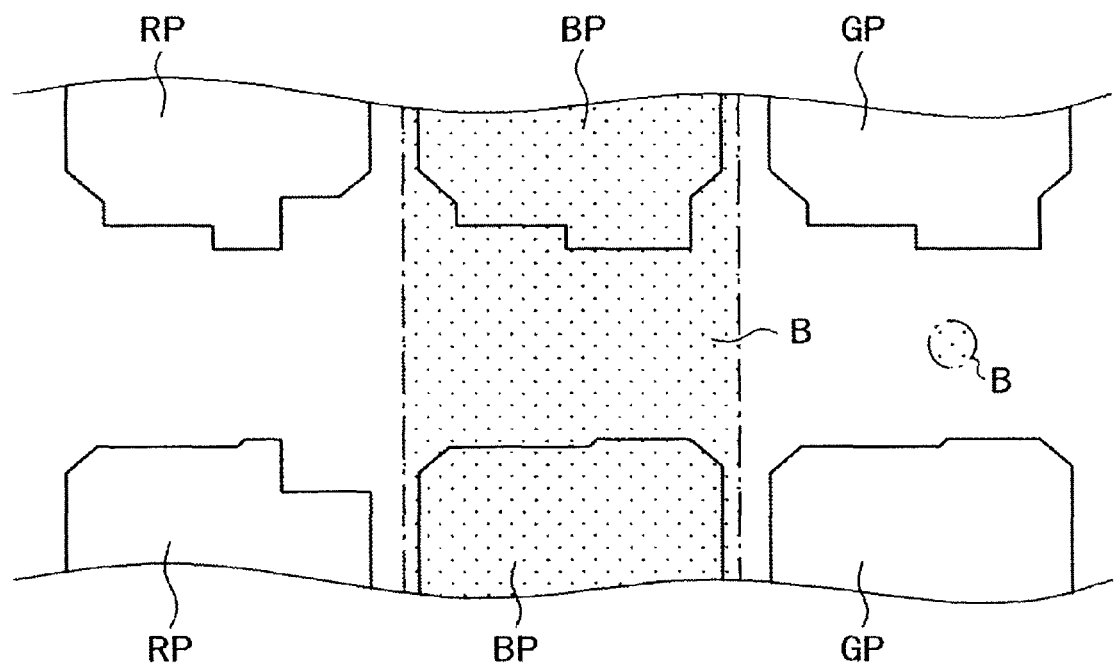
FIG. 14 is a plan diagram showing green color filters according to the second embodiment.

FIGS. 11 to 14 are diagrams illustrating a process for forming the facing substrate 200 shown in FIGS. 10A to 10E. FIGS. 11 and 12 correspond to FIGS. 2 and 3 showing the first embodiment. The present embodiment is different from the first embodiment in the form of the green color filter G in FIG. 13. As shown in FIG. 13, the green color filter G formed between blue pixels BP is circular in a plan diagram and has a smaller area than the green color filter G in the first embodiment. Accordingly, the green color filter G formed in the present embodiment is lower than the green color filter G formed in the first embodiment. After that, as shown in FIG. 14, a blue color filter B is formed in the same manner as in the first embodiment, and therefore, the description thereof is omitted.

Here, the present embodiment is different from the first embodiment in that only a red color filter R is formed on top of the black matrix BM between red pixels RP. Other parts of the configuration, as well as the effects, are the same as in the first embodiment.

As described above, in the present embodiment, the final height of the second spacer 20 is changed by changing the area of the layered color filters, and in addition there are leveling effects on color filters in upper layers as a result of a color filter in columnar form being initially formed. Meanwhile, in the case where it is desired for the height of the first spacer 10 to be greater, the area of the green color filter G in columnar form in the uppermost layer may be increased.

Third Embodiment

Figure 15:
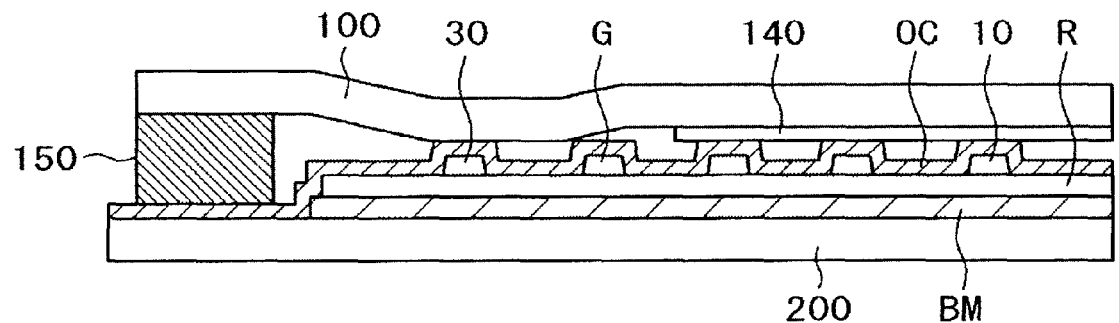
FIG. 15 is a cross sectional diagram showing a periphery portion of a liquid crystal display panel according to the prior art.

As shown in FIG. 6, a peripheral light blocking film 220 in frame form is formed of a black matrix BM outside the display region 210 on the facing substrate 200 of the liquid crystal display panel. The outside of the wiring region 140 on the TFT substrate 100 side, where TFT's and wires for these are formed, corresponds to the peripheral light blocking film 220, and the space between the TFT substrate 100 and the facing substrate 200 is great relative to the display region 210. Accordingly, when spacers having the same height as in the display region 210 are formed in the portion of the peripheral light blocking film 220, the distance between the TFT substrate 100 and the facing substrate 200 becomes small and, as shown in FIG. 15, the TFT substrate 100 deforms in the periphery portion, for example. FIG. 15 shows an example where a peripheral spacer 30 is formed of a red color filter R in a stripe or covering the whole substrate and a blue color filter B in columnar form. In FIG. 15, the thickness of the red color filter R and the blue color filter B is the same as in the display region. FIG. 15 shows a case where the TFT substrate 100 deforms, but in some cases the facing substrate 200 side deforms.

As described above, when the substrate deforms in the periphery, it affects the display region 210, so that the contrast lowers in the periphery of the display region 210. In order to prevent this, the peripheral spacers 30 in the portion of the peripheral light blocking film 220 may be made taller than the spacers in the display region 210. In this case, stress is applied to the glass substrate when the height of the spacers on the peripheral light blocking film 220 is rapidly changed relative to in the display region 210.

Figure 16:
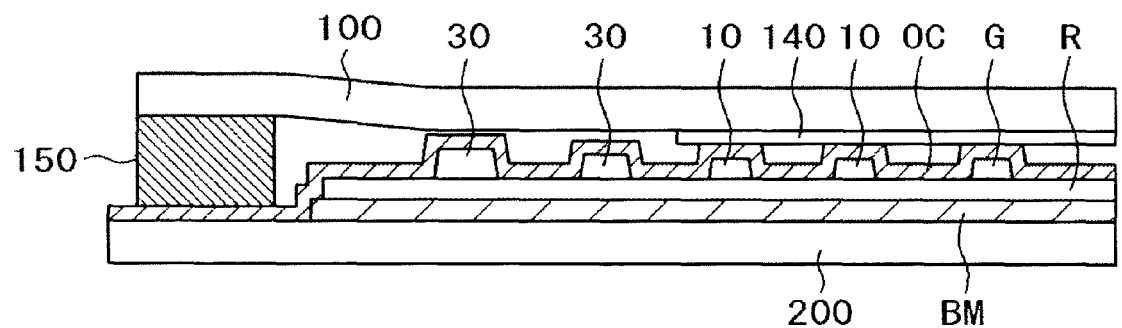
FIG. 16 is a cross sectional diagram showing a periphery portion of a liquid crystal display panel according to the third embodiment.

In the present embodiment, the area of peripheral spacers 30 in columnar form in the portion of the peripheral light blocking film 220 becomes greater toward the periphery, and thus, the height of the spacer in columnar form becomes greater toward the periphery, as shown in FIG. 16. That is to say, peripheral spacers 30 are formed of a red color filter R in a stripe and a green color filter in columnar form on top of this, and the area of the green color filters in columnar form becomes greater toward the periphery, and as a result, the height of the peripheral spacers 30 increases toward the periphery, as shown in FIG. 16. In the present embodiment, the height of the peripheral spacers 30 is easy to change, and thus, the contrast in the peripheral portion of the display region 210 can be prevented from lowering, and the stress on the TFT substrate 100 or the facing substrate 200 can be alleviated.

Fourth Embodiment

The present embodiment provides another configuration for preventing the contrast from lowering in the periphery of the display region 210 and preventing stress on the TFT substrate 100 and the facing substrate 200 when the space between the TFT substrate 100 and the facing substrate 200 becomes larger in the portion of the peripheral light blocking film 220 outside the display region 210, as described in the third embodiment.

Figure 17:
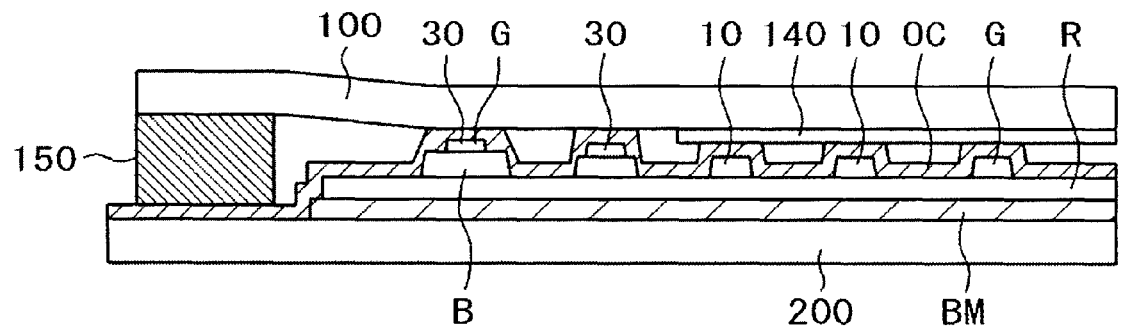
FIG. 17 is a cross sectional diagram showing a periphery portion of a liquid crystal display panel according to the fourth embodiment.

FIG. 17 shows the configuration of the present embodiment. In FIG. 17, peripheral spacers 30 are formed of three layers of color filters on the peripheral light blocking film 220 on the facing substrate 200. The peripheral spacers 30 in the present embodiment, where three color filter layers are used, are taller than the peripheral spacers in the third embodiment. In addition, in the present embodiment, green color filters G and blue color filters B are spacers in columnar form. In addition, the area of the green color filters G in columnar form is greater toward the periphery, and thus, the height of the spacers becomes gradually greater toward the periphery of the substrate.

Though in FIG. 17, the area and the height of the green color filters G vary, the area of the blue color filters B in columnar form may also vary, in the case where it is desired for the height of the spacers to be greatly different in the peripheral portion. Accordingly, the present embodiment allows for more freedom in the design in the case where it is desired for the height of the spacers in the periphery to be different.

Fifth Embodiment

Figure 18:
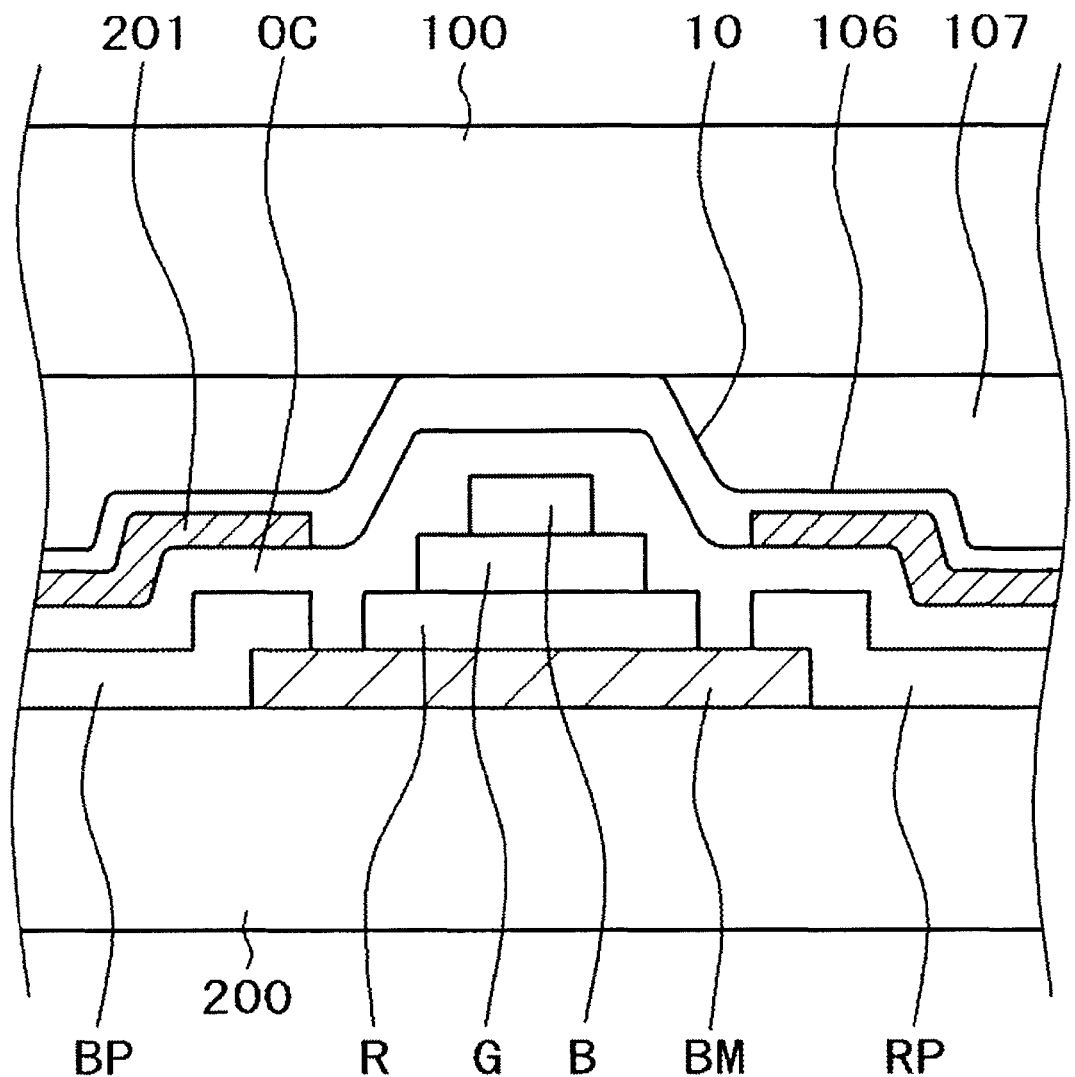
FIG. 18 is a cross sectional diagram showing a first spacer portion of the liquid crystal display panel according to the fifth embodiment.

In the first to fourth embodiments, examples where no counter electrodes 201 for controlling liquid crystal are formed on the facing substrate 200 are given. As described above, however, the present invention can be applied to configurations where counter electrodes 201 are formed on the facing substrate 200. FIG. 18 shows an example of such a configuration. FIG. 18 is a cross sectional diagram showing only a portion where a spacer is formed. In addition, FIG. 18 shows only a portion corresponding to a portion of the first spacer 10 in FIG. 7. Parts of the configuration other than the portion shown in FIG. 18 are the same as in the first and second embodiments.

In FIG. 18, a facing substrate 200 is provided on the lower side and a TFT substrate 100 is provided on the upper side. Wires and TFT's formed on the TFT substrate 100 are omitted. In FIG. 18, a black matrix BM is formed on the facing substrate 200, and a blue pixel BP and a red pixel RP are formed on the two sides of the black matrix BM. A red color filter R, a green color filter G and a blue color filter B are layered on top of the black matrix BM. The height of the spacer can be adjusted by changing the area of the spacer, as in the first and second embodiments.

In the present embodiment, counter electrodes 201 are formed on top of the overcoat film OC on the facing substrate 200. In the case where the counter electrodes 201 are formed also on top of the spacers in columnar form, there is a possibility that counter electrodes 201 and wires formed on the TFT substrate 100 may make contact, thus short-circuiting the counter electrodes 201 and the wires formed on the TFT substrate when the orientation film 106 breaks, when the TFT substrate 100 and the spacer make contact. In the present embodiment, as shown in FIG. 18, no counter electrodes 201 are formed in the spacer portions in order to avert this danger. When this configuration is provided, the present invention can be applied to cases where counter electrodes 201 are formed on the facing substrate 200.

In the above, a case where counter electrodes 201 are formed on the facing substrate 200 and the present invention is applied to the first spacers 10 is described, but the present invention can be also applied to the second spacers 20. That is to say, the second spacers 20 are shorter than the first spacers 10, and this can be achieved by using two color filter layers in the second spacers 20, or making the area of the color filters in columnar form smaller than in the first spacers 10.

Sixth Embodiment

Figure 19:
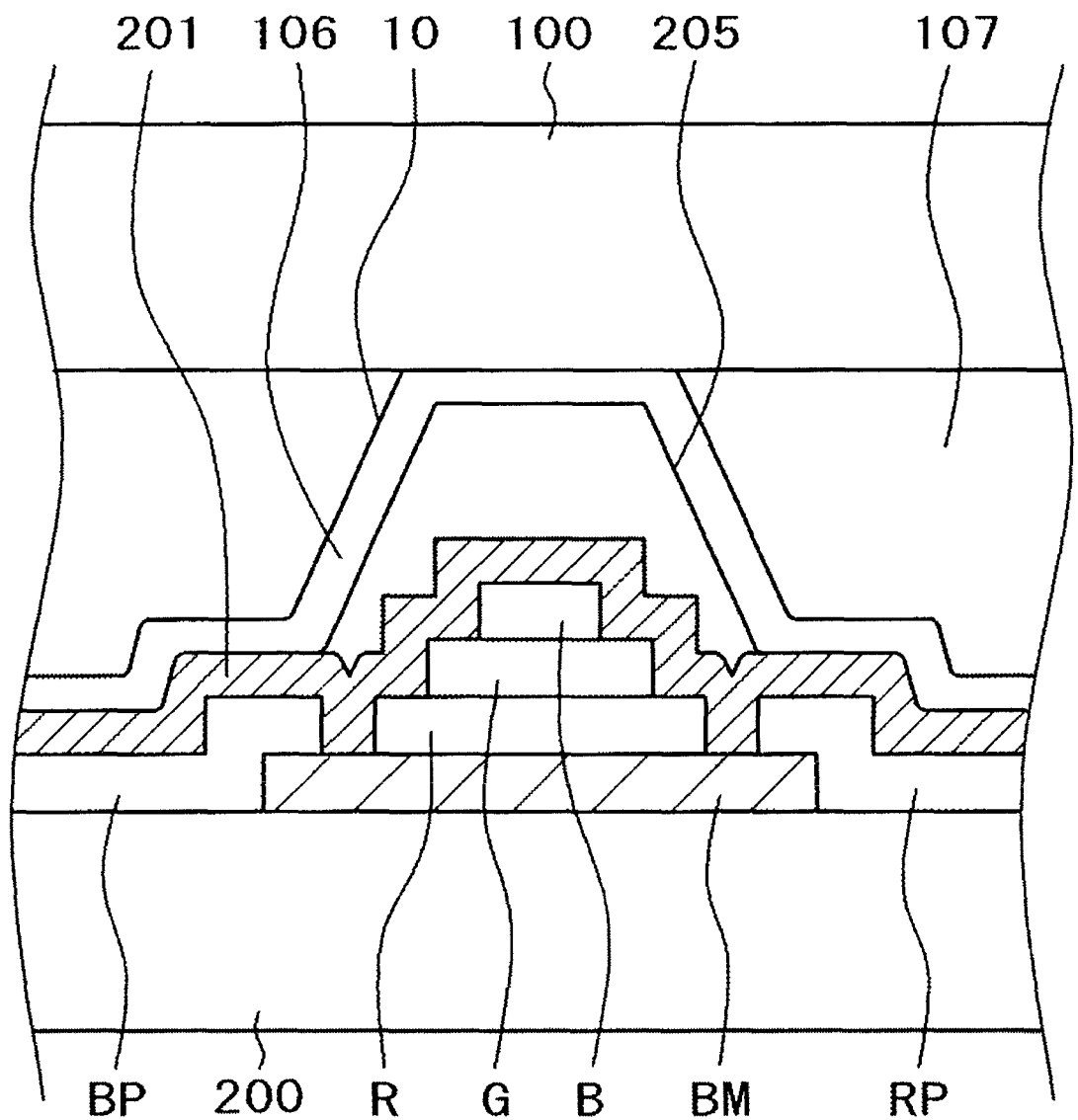
FIG. 19 is a cross sectional diagram showing a first spacer portion of the liquid crystal display panel according to the sixth embodiment.

FIG. 19 shows an example where the present invention is applied to a so-called VA system liquid crystal display device. FIG. 19 is a cross sectional diagram showing only a portion where a spacer is formed. In addition, the portion shown in FIG. 19 corresponds to a portion of the first spacer 10 in FIG. 7. Parts of the configuration other than the portion shown in FIG. 19 are the same as in the first and second embodiments.

In FIG. 19, a facing substrate 200 is provided on the lower side and a TFT substrate 100 is provided on the upper side. Wires and TFT's formed on the TFT substrate 100 are omitted. In FIG. 19, a black matrix BM is formed on the facing substrate 200, and a green pixel GP and a red pixel RP are formed on the two sides of the black matrix BM. A red color filter R, a green color filter G and a blue color filter B are layered on top of the black matrix BM. The height of the spacer can be adjusted by changing the area of the spacer, as in the first and second embodiments.

In the present embodiment, ribs 205 are provided on top of the spacers. These ribs 205 are formed so as to extend over the pixel electrodes and function to make liquid crystal molecules incline and widen the view angle on the pixel electrodes. In FIG. 19, the height of the spacers is adjusted by layering a red color filter R, a green color filter G and a blue color filter B, as in the first embodiment. In addition, the height of the spacers can be controlled by controlling the area of the color filters forming the spacers, or through leveling in accordance with a method for layering color filters, as in the first embodiment.

The present embodiment is different from the fifth embodiment in that counter electrodes 201 are formed on the facing substrate 200 so as to extend over the spacers made of color filters. That is to say, in the present embodiment, the possibility of the counter electrodes 201 and wires formed on the TFT substrate 10 short-circuiting is very small, due to the presence of the ribs 205, in addition to the orientation film 106, between the counter electrodes 201 and the TFT substrate 100, even when the counter electrodes 201 are formed on top of the spacers made of color filters, and thus, it becomes possible to provide this configuration.

As described above, the present invention can be applied also to VA systems. Though the above description relates to the first spacers 10 shown in FIG. 7, the invention can also be applied to the second spacers 20, as in the fifth embodiment.

What is claimed:

1. A liquid crystal display device, comprising a TFT substrate, a facing substrate and liquid crystal sandwiched between said TFT substrate and said facing substrate, characterized in that
   first pixels for displaying a first color by means of a first color filter are aligned in a longitudinal direction, second pixels for displaying a second color by means of a second color filter are aligned in the longitudinal direction, and third pixels for displaying a third color by means of a third color filter are aligned in the longitudinal direction on said facing substrate,
   said first color filters extend in stripes in the longitudinal direction so as to cover said first pixels, said second color filters extend in stripes in the longitudinal direction so as to cover said second pixels, and said third color filters extend in stripes in the longitudinal direction so as to cover said third pixels,
   first spacers are formed between said first pixels by layering a number of color filters, including said first color filters,
   second spacers are formed of a number of color filters, including said second color filters, between said second pixels,
   said first color filters which are formed between said second pixels are circular in plan view, and
   said first color filters extend in the lateral direction in stripes between said second pixels and between said third pixels.

2. The liquid crystal display device according to claim 1, characterized in that said first spacers are formed of three layers of color filters, including said first color filters, and said second spacers are formed of three layers of color filters, including said second color filters.

3. The liquid crystal display device according to claim 1, characterized in that a number of color filters are layered between said third pixels.

4. The liquid crystal display device according to claim 1, characterized in that an area of color filters on a lower side from among said number of color filters configuring said first spacers is greater than an area of color filters on an upper side, and the area of color filters on the lower side from among said number of color filters configuring said second spacers is smaller than the area of color filters on the upper side.

5. A liquid crystal display device, comprising a TFT substrate, a facing substrate which a counter electrode is formed on, and liquid crystal sandwiched between said TFT substrate and said facing substrate, characterized in that
   first pixels for displaying a first color by means of a first color filter are aligned in a longitudinal direction, second pixels for displaying a second color by means of a second color filter are aligned in the longitudinal direction, and third pixels for displaying a third color by means of a third color filter are aligned in the longitudinal direction on said facing substrate,
   said first color filters extend in stripes in the longitudinal direction so as to cover said first pixels, said second color filters extend in stripes in the longitudinal direction so as to cover said second pixels, and said third color filters extend in stripes in the longitudinal direction so as to cover said third pixels,
   first spacers are formed between said first pixels by layering a number of color filters, including said first color filters, and
   said counter electrode is not formed in portions of said first spacers.

6. The liquid crystal display device according to claim 5, characterized in that second spacers are formed of a number of color filters, including said second color filters, between said second pixels.

7. The liquid crystal display device according to claim 6, characterized in that said first spacers are taller than said second spacers.

8. The liquid crystal display device according to claim 6, characterized in that said first spacers are formed of three layers of color filters, including said first color filters, and said second spacers are formed of three layers of color filters, including said second color filters.

9. The liquid crystal display device according to claim 6, characterized in that an area of color filters on a lower side from among said number of color filters configuring said first spacers is greater than an area of color filters on an upper side, and the area of color filters on the lower side from among said number of color filters configuring said second spacers is smaller than the area of color filters on the upper side.

10. The liquid crystal display device according to claim 5, characterized in that said first color filters extend in a lateral direction in stripes between said second pixels and between said third pixels.

11. The liquid crystal display device according to claim 5, characterized in that said first color filters which are formed between said second pixels are circular in plan view.

12. The liquid crystal display device according to claim 5, characterized in that a number of color filters are layered between said third pixels.

13. A liquid crystal display device, comprising a TFT substrate, a facing substrate which a counter electrode is formed on, and liquid crystal sandwiched between said TFT substrate and said facing substrate, characterized in that
   first pixels for displaying a first color by means of a first color filter are aligned in a longitudinal direction, second pixels for displaying a second color by means of a second color filter are aligned in the longitudinal direction, and third pixels for displaying a third color by means of a third color filter are aligned in the longitudinal direction on said facing substrate,
   said first color filters extend in stripes in the longitudinal direction so as to cover said first pixels, said second color filters extend in stripes in the longitudinal direction so as to cover said second pixels, and said third color filters extend in stripes in the longitudinal direction so as to cover said third pixels,
   first spacers are formed between said first pixels by layering a number of color filters, including said first color filters,
   said counter electrode extends over said first spacers,
   ribs are provided on top of said first spacers, said first color filters extend in a lateral direction in stripes between said second pixels and between said third pixels.

14. The liquid crystal display device according to claim 13, characterized in that second spacers are formed of a number of color filters, including said second color filters, between said second pixels.

15. The liquid crystal display device according to claim 14, characterized in that said first spacers are taller than said second spacers.

16. The liquid crystal display device according to claim 14, characterized in that said first spacers are formed of three layers of color filters, including said first color filters, and said second spacers are formed of three layers of color filters, including said second color filters.

17. The liquid crystal display device according to claim 15, characterized in that an area of color filters on a lower side from among said number of color filters configuring said first spacers is greater than an area of color filters on an upper side, and the area of color filters on the lower side from among said number of color filters configuring said second spacers is smaller than the area of color filters on the upper side.

18. The liquid crystal display device according to claim 13, characterized in that said first color filters which are formed between said second pixels are circular in plan view.

19. The liquid crystal display device according to claim 13, characterized in that a number of color filters are layered between said third pixels.

* * * * *